(12) United States Patent
Williams

(10) Patent No.: US 7,477,806 B2
(45) Date of Patent: Jan. 13, 2009

(54) CROSSOVER-FREE FIBER OPTIC COIL SENSOR AND WINDING METHOD

(75) Inventor: Marty R. Williams, Huntsville, AL (US)

(73) Assignee: Morgan Research Corporation, Huntsville, AL (US)

( * ) Notice: Subject to any disclaimer, the term of this patent is extended or adjusted under 35 U.S.C. 154(b) by 0 days.

(21) Appl. No.: 11/741,089

(22) Filed: Apr. 27, 2007

(65) Prior Publication Data

US 2008/0130010 A1    Jun. 5, 2008

Related U.S. Application Data

(60) Provisional application No. 60/796,014, filed on Apr. 28, 2006.

(51) Int. Cl.
| | |
|---|---|
| *G02B 6/00* | (2006.01) |
| *G01C 19/72* | (2006.01) |
| *B65H 75/18* | (2006.01) |
| *B29C 65/56* | (2006.01) |
| *B29C 65/48* | (2006.01) |

(52) U.S. Cl. ................ 385/12; 385/100; 385/135; 356/465; 242/609; 156/459; 156/184; 156/192

(58) Field of Classification Search ............... 385/100, 385/134, 135, 136, 137, 138, 12; 356/465, 356/350; 156/459, 184, 192; 242/118, 118.3, 242/118.4, 118.41, 118.7, 125, 125.1, 125.2, 242/125.3, 609
See application file for complete search history.

(56) References Cited

U.S. PATENT DOCUMENTS

| | | | | |
|---|---|---|---|---|
| 5,052,632 A | * | 10/1991 | Stokes, Jr. ............... | 242/476.7 |
| 5,781,301 A | | 7/1998 | Ruffin ..................... | 356/350 |
| 2008/0130010 A1 | * | 6/2008 | Williams ................. | 356/465 |

* cited by examiner

*Primary Examiner*—Brian M Healy
(74) *Attorney, Agent, or Firm*—Greenberg Traurig LLP

(57) ABSTRACT

A method for winding a crossover-free fiber optic coil sensor comprising: attaching a fiber optic cable to an outer edge of a coil form, wherein the coil form comprises a first side and a second side; forming a first outside-in coil layer on the first side of the coil form using a first winding head; attaching a first inside-out separator on top of the first outside-in coil layer; forming a first inside-out coil layer on top of the first inside-out separator using the first winding head; forming a second outside-in coil on the second side of the coil form using a second winding head; attaching a second inside-out separator on top of the second outside-in coil layer; and forming a second inside-out coil layer on top of the second inside-out separator using the second winding head.

58 Claims, 14 Drawing Sheets

CROSSOVER-FREE FIBER OPTIC COIL SENSOR AND WINDING METHOD

This application claims priority from Provisional U.S. Patent Application Ser. No. 60/796,014, filed Apr. 28, 2006, which is hereby incorporated by reference in its entirety.

GOVERNMENT LICENSE RIGHTS

This invention was made with Government support under contract number DAAH01-03-C-R203, awarded by the United States Department of Defense. The Government has certain rights in the invention.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The instant disclosure relates to the field of fiber optics. More particularly, the present invention relates to the field of wound optical fibers and fiber optic sensors.

BACKGROUND OF THE INVENTION

Fiber optic gyroscopes ("FOGs") utilize a coiled length of fiber optic to detect minute amounts of rotation. The output of a light source is split whereby two light beams are created and directed into the opposite ends of a coiled length of fiber optic cable. When the FOG is rotated, the light beam traveling against the direction of rotation will experience a shorter optical path than the light beam traveling in the direction of rotation, resulting in a phase shift between the two beams. This phase shift can be measured through various means, including interferometry, to determine the magnitude of the rotation experienced by the FOG.

Recent FOG developments have focused on system miniaturization and cost reduction for use in many applications, including tactical weapon systems and inertial guidance systems. Reducing the size of the fiber optic gyroscope, without sacrificing the performance, requires that considerable attention be given to the coil of wound optical fiber that comprises the sensor. This is because reducing the size of a fiber optic coil made using conventional winding configurations would greatly increase the number of "crossover" sites.

Crossover sites are the places in a conventional winding scheme (i.e., one in which fibers are wound on a spool axially in a layer, and then subsequent layers build up on the first layer) at which a fiber in one layer crosses over a fiber of a lower layer at an angle that puts stress on the fiber. These crossover sites have been found to cause random polarization cross-coupling in the single mode fiber coil that substantially degrades the fiber optic gyroscope technology performance, causing polarization non-reciprocal ("PNR") bias errors in the depolarized FOGs.

In the past, navigation-grade performance FOG designs have required the use of relatively expensive polarization-maintaining ("PM") fibers. Eliminating crossovers allows for an inexpensive single mode ("SM") fiber solution, which reduces the overall cost of the FOG. Due to the significant cost advantage of SM fibers, depolarized interferometric FOGs have great cost-lowering potential.

Another problem with conventional FOGs is the presence of time-varying thermal gradients, which are a large source of FOG error. Time-varying thermal gradients result in a phenomenon known as the Shupe effect, a phase shift due to time varying temperatures experienced by different segments of the coil, and resulting in increased bias. Reducing varying thermal gradients requires complex, costly and time-consuming winding patterns that ensure that the phase shifts are symmetrical and do not result in bias. These types of winding patterns have not been compatible with automatic, high-speed winding systems.

A crossover-free and thermally-symmetric method of winding fiber optic sensor coils was disclosed in Ruffin, U.S. Pat. No. 5,781,301 ("the '301 patent"). An explanatory illustration of the method disclosed in the '301 patent is provided at FIG. 1. This method eliminated traditional crossovers by winding the fiber in radial outside-in and inside-out layers that are stacked, instead of winding axially in overlapping layers as has been done conventionally. In the method disclosed in the '301 patent, two feed spools are wound each with half of the total length of optical fiber, and the first layer of fiber is wound on a planar side of a hollow disk-shaped coil form in a spiral pattern from the inner diameter of the disk to the outer diameter of the disk. The fiber is secured to the coil form with an adhesive. A second spiral layer is a mirror-image of the first, and is applied on the opposite planar side of the coil form. Subsequent spiral layers are wound such that the fiber loops which are positioned at equal distances from the center of the fiber optic coil are mirror images of the fiber loops on the opposite side of the thin hollow disk. This technique is intended to minimize the time-varying thermal gradients in the radial direction.

The invention disclosed in the '301 patent also provides for winding fiber layers in pairs and sequentially alternating the layer pairs, which are formed from fiber drawn from the two fiber feed spools, across each side of the thin coil form to minimize time-varying thermal gradients in the axial direction. Each fiber spiral pair has a layer wound from the inside to the outside, and another layer wound from the outside to the inside. The resultant coil therefore provides thermal symmetry, which greatly reduces both the radial and axial components of time-varying thermal gradients.

Although the winding method and fiber coil disclosed in the '301 patent is an improvement over the prior art, opportunities for substantial improvement over the prior art exist. One disadvantage of the winding method disclosed in the '301 patent is that subsequent layer of coils after the first layers on either side of the coil form are laid directly on top of the preceding layers, a practice that could result in slumps and sags of the optical fiber. In addition, because the layers are laid directly on top of one another, there are "contact points" between the contacting layers in each coil of fiber that are similar to the crossover sites in a conventional winding scheme, but which are subjected to much less stress than those crossovers. (See '301 patent, Col. 4 lines 13-30). However, it would be desirable if there were no such crossover or contact points. Further, errors in the winding pattern are rapidly compounded as layer count increases, as each previous layer directly affects the positioning of the subsequent layer.

Additionally, the process disclosed in the '301 patent starts the initial wind with the optical fiber passing through the center of the coil form with the winding performed from the inside to the outside on both sides of the coil form. To accomplish this in production, it would be necessary to either spool the fiber through the center hole in the coil form on the winder or cut a passage in the coil form from outer to inner diameters to allow pre-spooled fiber to pass through the coil form body to the center. Spooling the fiber through the center hole is not practical from a manufacturing standpoint when using an automated winding configuration, and cutting a passage in the coil form compromises the structural stability and symmetry of the coil form. It would therefore be desirable to have a winding method that does not require passing the pre-spooled fiber through the center of the coil form.

SUMMARY OF THE INVENTION

Accordingly, the instant disclosure is directed to a crossover-free fiber optical coil sensor and winding method that substantially obviates one or more of the problems due to limitations and disadvantages of the related art.

Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

It is therefore an object of the present invention to provide a radially-wound stacked-layer fiber optic coil and method for winding a fiber optic coil that is favorable for manufacture via an automatic winding process.

It is a further object of the present invention to provide a radially-wound fiber optic coil and method for winding a fiber optic coil that substantially eliminates crossover sites or contact points between the optical fibers.

It is another object of the present invention to provide a wound fiber optic coil and method for winding a fiber optic coil that does not require passing of the pre-wound optical fiber through the center of the coil form.

It is yet another object of the present invention to provide a wound fiber optic coil and winding method which reduces time-varying thermal gradients.

In some embodiments the invention provides a method for winding a crossover-free fiber optic coil sensor comprising: winding fiber optic cable onto a first supply spool and a second supply spool; attaching the fiber optic cable to an outer edge of a coil form, wherein the coil form comprises a first side and a second side; forming a first outside-in coil layer on the first side of the coil form using a first winding head, wherein the first supply spool supplies fiber optic cable to the first winding head; attaching a first inside-out separator on top of the first outside-in coil layer; forming a first inside-out coil layer on top of the first inside-out separator using the first winding head, wherein the first supply spool supplies fiber optic cable to the first winding head; forming a second outside-in coil on the second side of the coil form using a second winding head, wherein the second supply spool supplies fiber optic cable to the second winding head; attaching a second inside-out separator on top of the second outside-in coil layer; and forming a second inside-out coil layer on top of the second inside-out separator using the second winding head, wherein the second supply spool supplies fiber optic cable to the second winding head.

In some embodiments the invention provides a method for winding a crossover-free fiber optic coil sensor further comprising: attaching a first outside-in separator on top of the second inside-out coil layer; forming a third outside-in coil layer on top of the first outside-in separator with the first winding head, wherein the first supply spool supplies fiber optic cable to the first winding head; attaching a third inside-out separator on top of the third outside-in coil layer; and, forming a third inside-out coil layer on top of the third inside-out separator with the first winding head, wherein the first supply spool supplies fiber optic cable to the first winding head.

In some embodiments the invention provides a method for winding a crossover-free fiber optic coil sensor further comprising: attaching a second outside-in separator on top of the first inside-out coil layer; forming a fourth outside-in coil layer on top of the second outside-in separator with the second winding head, wherein the second supply spool supplies fiber optic cable to the second winding head; attaching a fourth inside-out separator on top of the fourth outside-in coil layer; and forming a fourth inside-out coil layer on top of the fourth inside-out separator with the second winding head, wherein the second supply spool supplies fiber optic cable to the second winding head.

In some embodiments the invention provides a crossover-free fiber optic coil sensor comprising: a coil form, wherein the coil form comprises a first side, a second side, and an outer edge; a fiber optic cable comprising a first fiber section and a second fiber section, wherein at least a portion of the fiber optic cable is attached to the outer edge of the coil form; a first outside-in coil layer, formed on the first side of the coil form, wherein the first outside-in coil layer is formed from the first fiber section; a first inside-out separator attached on top of the first outside-in coil layer; a first inside-out coil layer, formed on top of the first inside-out separator, wherein the first inside-out coil layer is formed from the first fiber section; a second outside-in coil layer, formed on the second side of the coil form, wherein the second outside-in coil layer is formed from the second fiber section; a second inside-out separator attached on top of the second outside-in coil layer; and, a second inside-out coil layer, formed on top of the second inside-out separator, wherein the second inside-out coil layer is formed from the second fiber section.

In some embodiments the invention provides a crossover-free fiber optic coil sensor further comprising: a first outside-in separator attached on top of the second inside-out coil layer; a third outside-in coil layer, formed on top of the first outside-in separator, wherein the third outside-in coil layer is formed from the first fiber section; a third inside-out separator attached on top of the third outside-in coil layer; a third inside-out coil layer, formed on top of the second inside-out separator, wherein the third inside-out coil layer is formed from the first fiber section; a second outside-in separator attached on top of the first inside-out coil layer; a fourth outside-in coil layer, formed on top of the second outside-in separator, wherein the fourth outside-in coil layer is formed from the second fiber section; a fourth inside-out separator attached on top of the fourth outside-in coil layer; and, a fourth inside-out coil layer, formed on top of the fourth inside-out separator, wherein the fourth inside-out coil layer is formed from the second fiber section.

It is to be understood that both the foregoing general description and the following detailed description are exemplary and explanatory and are intended to provide further explanation of the disclosed crossover-free fiber optic coil sensor and winding method.

BRIEF DESCRIPTION OF THE DRAWINGS

The accompanying drawings, which are included to provide a further understanding of the disclosed crossover-free fiber optical coil sensor and winding method and are incorporated in and constitute a part of this specification, illustrate various embodiments and, together with the description, serve to explain the principles of at least one embodiment of the disclosed crossover-free fiber optical coil sensor and winding method.

In the drawings.

DETAILED DESCRIPTION OF EMBODIMENTS OF THE INVENTION

Reference will now be made in detail to embodiments of the disclosed crossover-free fiber optical coil sensor and winding method, examples of which are illustrated in the accompanying drawings.

Figure 1:
FIG. 1 is a diagram illustrating the steps involved in the winding method disclosed by U.S. Pat. No. 5,781,301.
Figure 2:
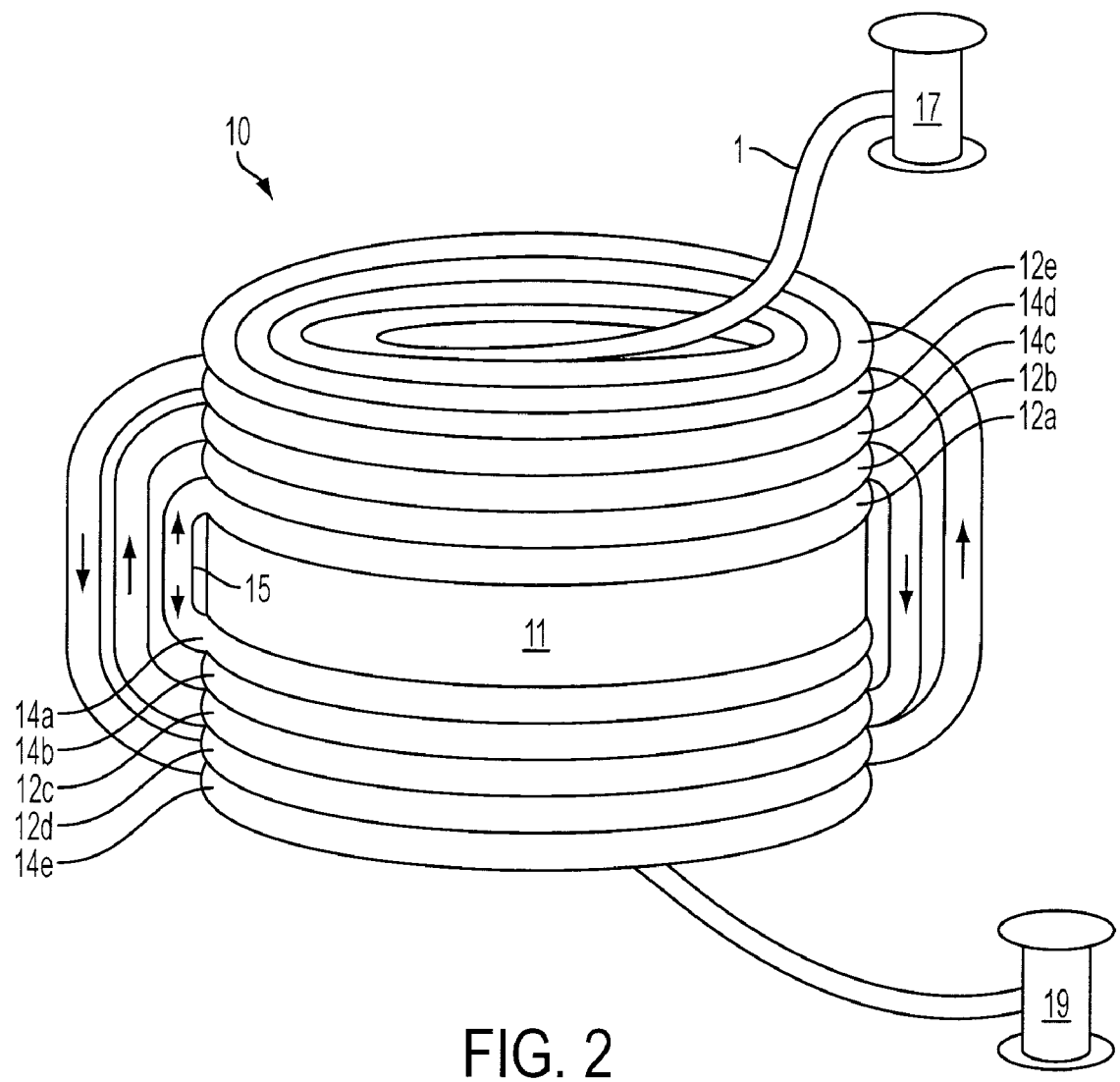
FIG. 2 is a diagram illustrating fabrication of a fiber optic sensor in accordance with an embodiment of the invention.

FIG. 2 is a diagram illustrating various embodiments of the invention wherein a coil form 11 (similar to a flat ring washer) provides structural support for a fiber optic coil 10. The fiber optic coil 10 comprises a plurality of coil layers, 12a through 12e and 14a through 14e formed from fiber optic cable 1 supplied from a first supply spool 17 and a second supply spool 19, respectively.

In some embodiments, winding of the fiber optic coil 10, is initiated by winding fiber optic cable onto a first supply spool 17 and a second supply spool 19. In a preferred embodiment, the amount of fiber optic cable wound onto the first supply spool 17 and the amount of fiber optic cable wound onto the second supply spool 19 are substantially equal in length. The amount of fiber optic cable wound onto the first supply spool 17 and the amount of fiber optic cable wound onto the second supply spool 19 may differ in length without departing from the spirit and scope of the invention. The fiber optic cable may comprise a single continuous fiber optic cable or be comprised of multiple segments of fiber optic cable. In some embodiments, the fiber optic cable may comprise single mode fiber optic cable. Suitable single mode fiber optic cable includes, e.g., GyroSil® Clearlite BF06158, manufactured by OFS of Norcross, Ga. Of course, any single mode fiber optic cable or polarization-maintaining fiber optic cable could be used without departing from the spirit and scope of the invention.

Figure 3:
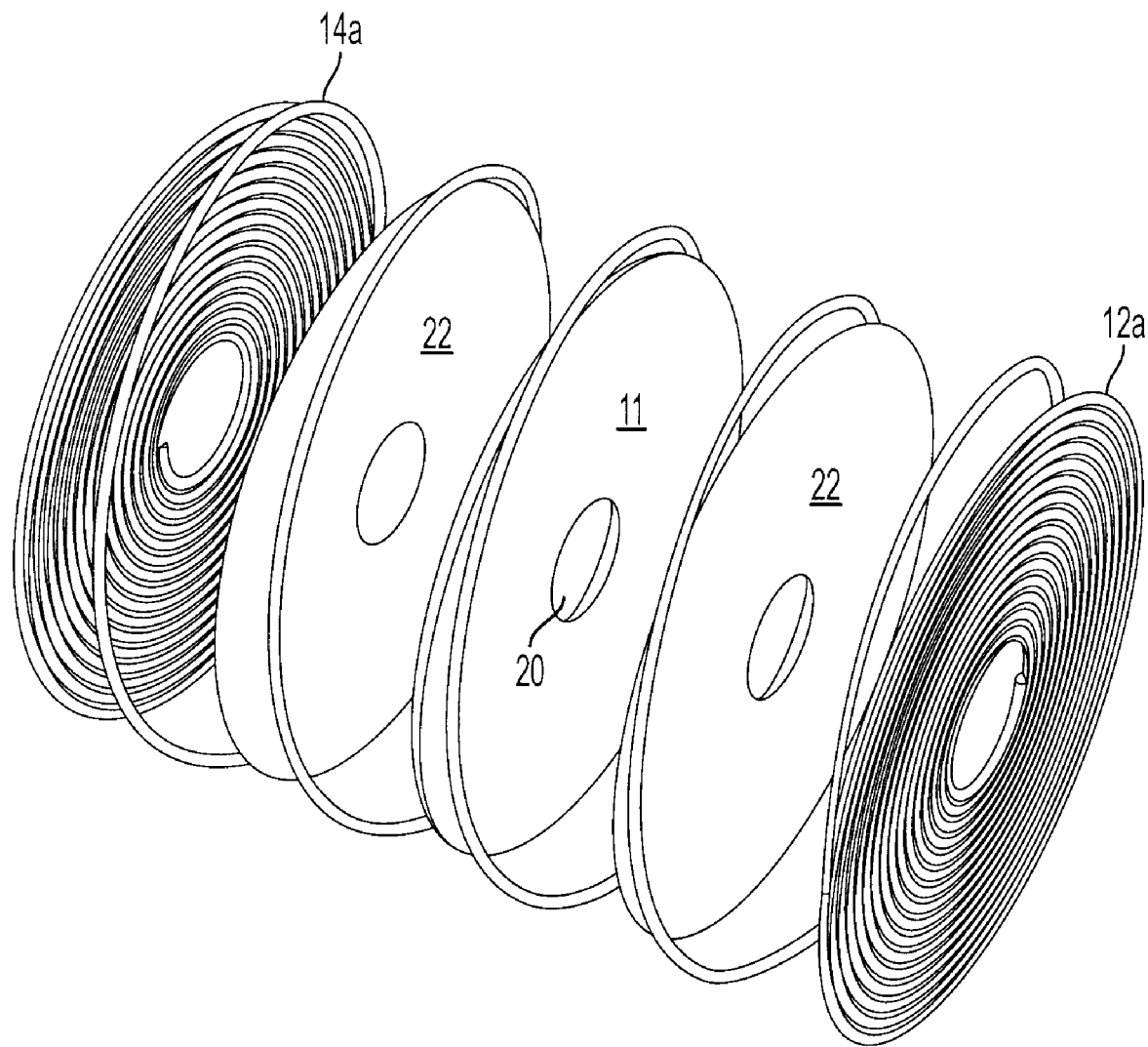
FIG. 3 is a diagram illustrating an exploded view of a partial fiber optic sensor coil fabricated according to an embodiment of the invention.

In some embodiments, a portion of the fiber optic cable is then attached to an outer edge of the coil form 11. In some embodiments, the portion of the fiber optic cable that is attached to the outer edge of the coil form may be the center 15 of the fiber optic cable. The coil form 11 also comprises a first side, a second side, and an inner aperture 20, as shown in FIG. 3. The coil form 11 may be formed of a rigid material to provide mechanical strength to the fiber optic coil. Coil form 11 may also comprise a heat conductive material, such as copper, to provide enhanced thermal characteristics. Of course, coil form 11 may be formed of other materials without departing from the spirit and scope of the invention.

Figure 13:
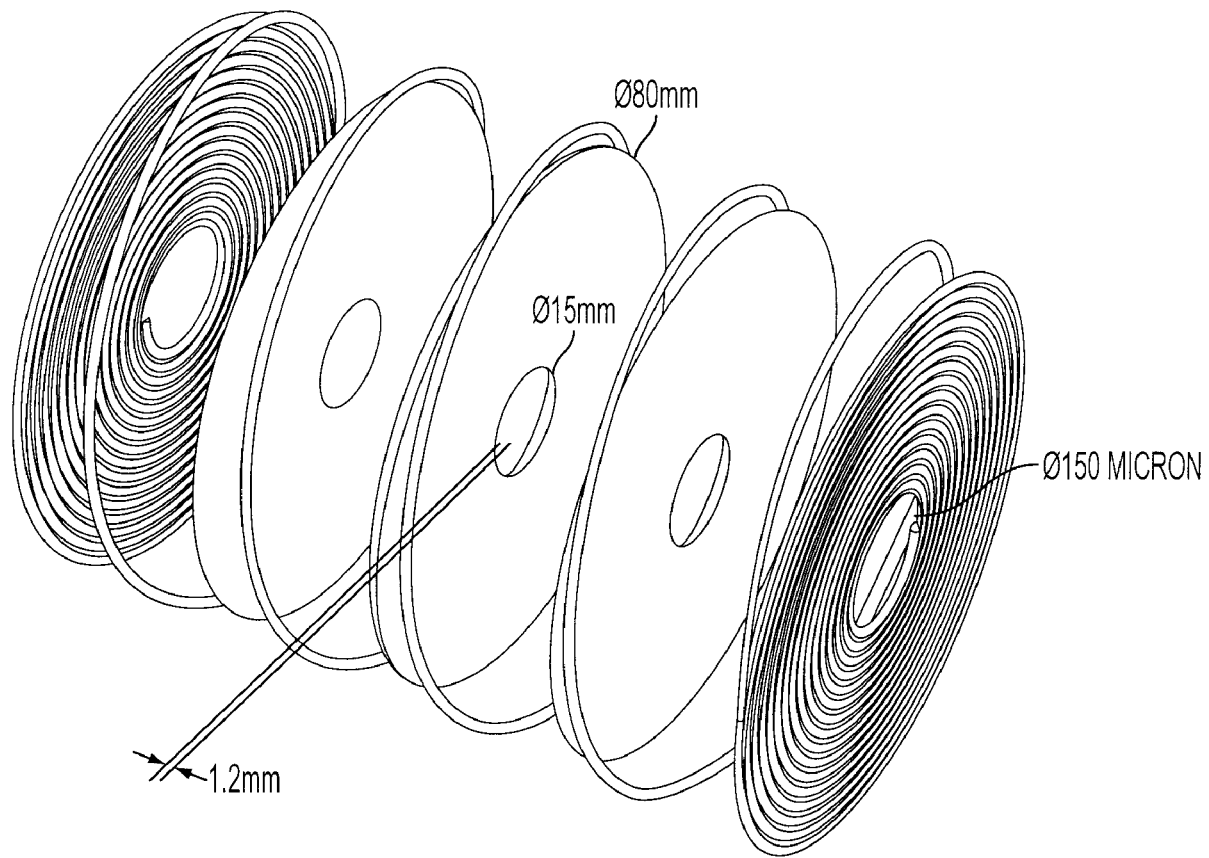
FIG. 13 is a dimensioned drawing of the partial fiber optic sensor coil of FIG. 3.

In some embodiments, as shown in FIG. 13, inner aperture 20 may have a diameter of 15 mm. The coil form 11, may have a diameter of 80 mm and a thickness of 1.2 mm. Of course these dimensions may vary substantially according to the desired performance characteristics of the fiber optic coil 10 without departing from the spirit and scope of the invention.

In some embodiments, a first outside-in coil layer 12a is formed on the first side of the coil form 11 using a first winding head. The first supply spool 17 supplies fiber optic cable to the first winding head. The terminology "outside-in" denotes a coil layer that begins at the outer edge of the coil form 11 and is wound toward the inner aperture 20 of the coil form 11. Conversely, "inside-out" denotes a coil layer that begins at the inner aperture 20 of coil form 11 and is wound toward the outer edge of the coil form 11. The first outside-in coil layer 12a is formed by the first winding head, which accurately positions the fiber optic cable supplied by the first supply spool 17 onto the surface of the coil form 11, in a series of closely wound spiral loops such that the center of the coil form 11 is coincident with the center of the loops. The first outside-in coil layer 12a is formed using a low-tension winding scheme which requires that the fiber optic cable be "tacked" into place as it is laid down on the coil form 11. Therefore an adhesive 22 is applied prior to forming a coil layer. Suitable adhesives include double-sided adhesive tapes such as part 444 manufactured by 3M Company of St. Paul, Minn. Of course, other adhesives may be used without departing from the spirit and scope of the invention. FIG. 3 schematically illustrates two thermally symmetric coil layers 12a, 14a secured to coil form 11 using adhesive layers 22. In an embodiment, the first outside-in coil layer 12a is formed by a first winding head on the first side of coil form 11, and the second outside-in coil layer 14a is formed by a second winding head on the second side of coil form 11. Each outside-in coil layer is advantageously combined with an inside-out coil layer, as detailed below.

Figure 4:
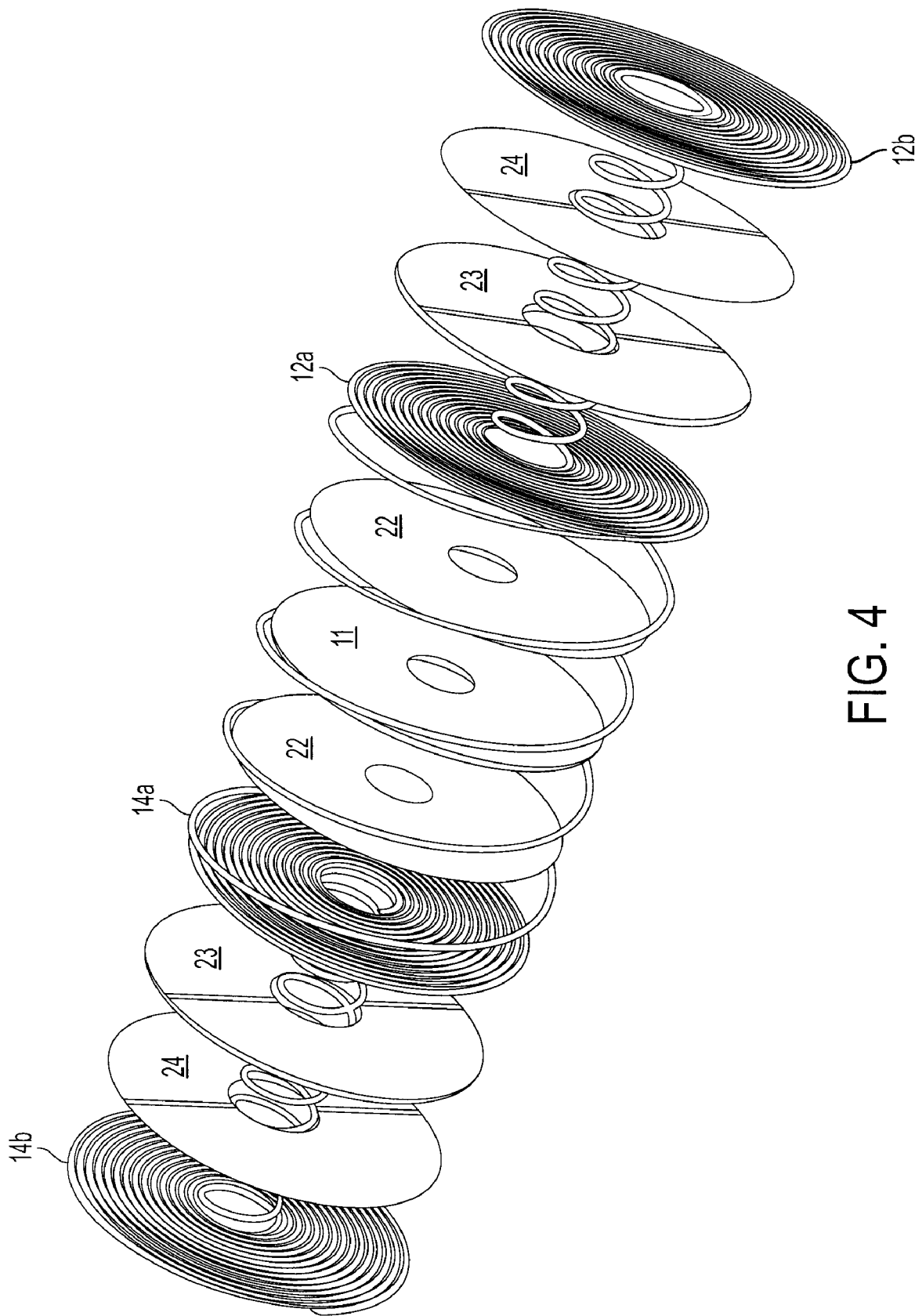
FIG. 4 is a diagram illustrating an exploded view of a partial fiber optic sensor coil fabricated according to an embodiment of the invention.

FIG. 4 is an exploded schematic view of a fiber optic coil sensor with four thermally symmetric layers (two on each side of the coil form 11), in accordance with embodiments of the invention. In some embodiments, a first inside-out separator 23 is attached on top of the first outside-in coil layer 12a. The first inside-out separator 23 may be comprised of a first half and a second half to improve the manufacturability of the fiber optic coil 10. The first inside-out separator 23 may comprise a heat conductive material, e.g. copper, to improve the thermal balance of the fiber optic coil 10. A first inside-out coil layer 12b is formed on top of the first inside-out separator 23 using the first winding head. The first inside-out coil layer 12b may be adhered to the first inside-out separator by a split adhesive sheet 24. The split adhesive sheet 24 may comprise a double-sided adhesive tape such as part 444 manufactured by 3M Company of St. Paul, Minn. (Of course, other adhesives may be used without departing from the spirit and scope of the invention.) In an embodiment, the coil form is flipped over after coil layer 12b is formed, and the second outside-in coil layer 14a is formed using the second winding head. Coil layer 14a is adhered to the second side of coil form 11 using an adhesive layer 22. A second inside-out separator 23 is then placed over the coil layer 14a; this separator is preferably split into a first half and second half so that the fiber optic cable may pass through the central aperture thereof. A second inside-out coil layer 14b is then formed on the separator, and is adhered thereto by another split adhesive sheet 24. The coil form 11 may then be flipped over again, to form additional coil layers on the first side of the coil form. It will be appreciated that as many thermally symmetric coil layers as desired may be fabricated by repeating the above-described steps. The repetition of outside-in and inside-out coil winding, together with the use of adhesive layers and separators, ensures that the finished fiber optic coil sensor is crossover-free, thermally symmetric, and structurally stable. As shown in FIG. 4, a fiber optic coil sensor embodying the invention has a first set of coil layers on the first side of the coil form, and a second set of coil layers on the second side of the coil form; the first set and the second set have equal numbers of layers and substantially equal lengths of fiber optic cable. It should be noted that fiber optic cable connections between the first set and the second set are located only outside the circumference of the coil form; that is, no cable is led through the central aperture of the coil form.

Figure 5:
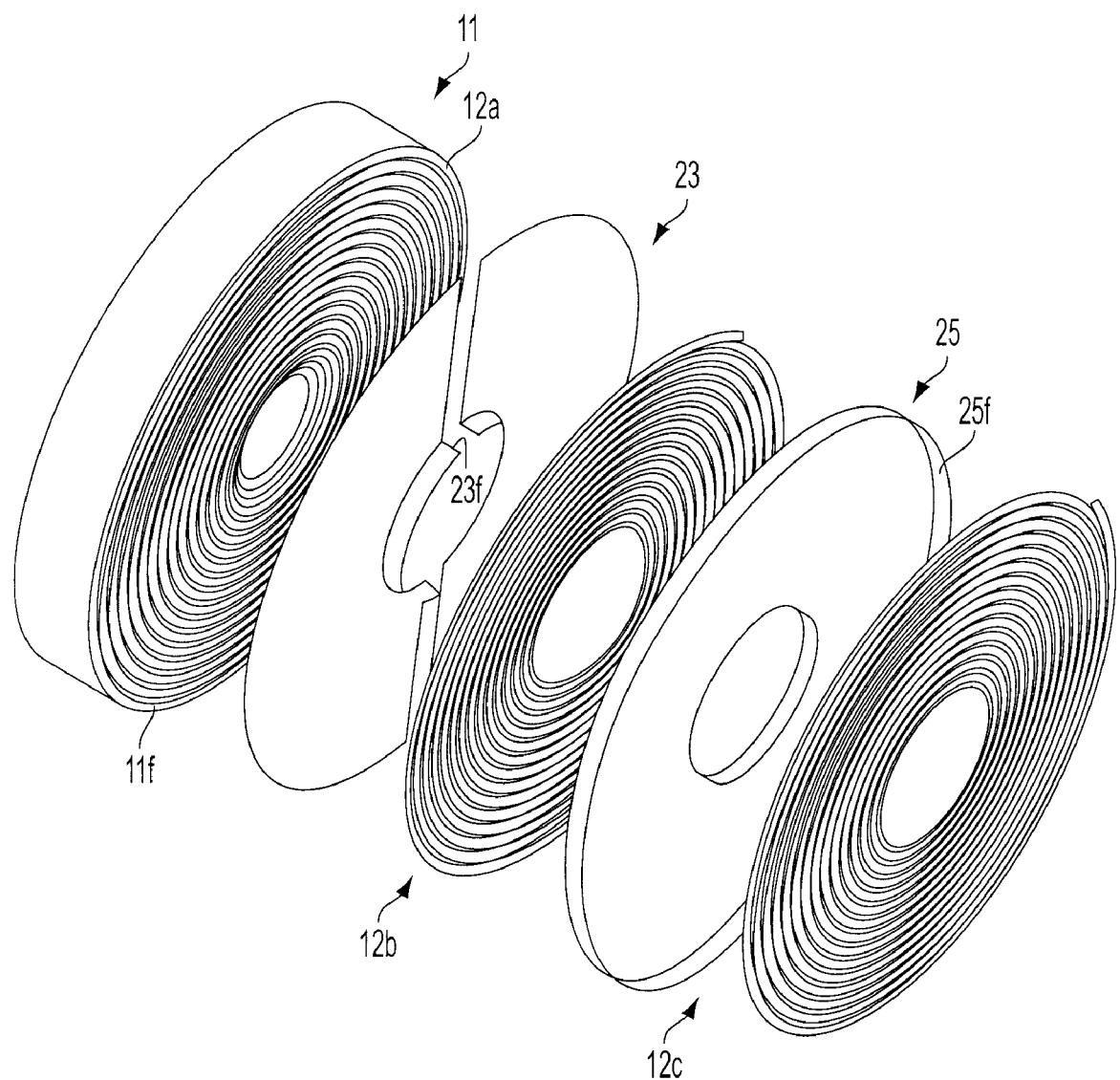
FIG. 5 is a diagram illustrating a partial exploded view of a fiber optic sensor coil, according to an embodiment of the invention, with separator sheets between coils of fiber.

The coil form and separators may include flanges for holding the coil layers in place, as shown in FIG. 5. In the embodiment shown in FIG. 5, coil form 11 has a flange 11f at the outer edge thereof, so that the first outside-in coil layer 12a fits inside the flange. The first inside-out separator 23 has a flange 23f surrounding the central aperture; the first inside-out coil layer 12b is formed around the flange 23f. An additional outside-in separator 25 has a flange 25f at its circumference, so that the third outside-in coil layer 12c fits inside flange 25f.

In other embodiments, the first inside-out separator 23 may comprise perforations. Potting material may be applied to the first outside-in coil layer 12a. Suitable potting materials include, e.g. EP29LPSP epoxy available from Master Bond. Of course, one could use another potting material without departing from the spirit and scope of the invention. When the first inside-out separator 23 comprises perforations, excess potting material from the first outside-in coil layer 12a will come through the perforations and act as an adhesive during the formation of the first inside-out coil layer 12b, rendering the split adhesive sheet 24 unnecessary.

Figure 6A:
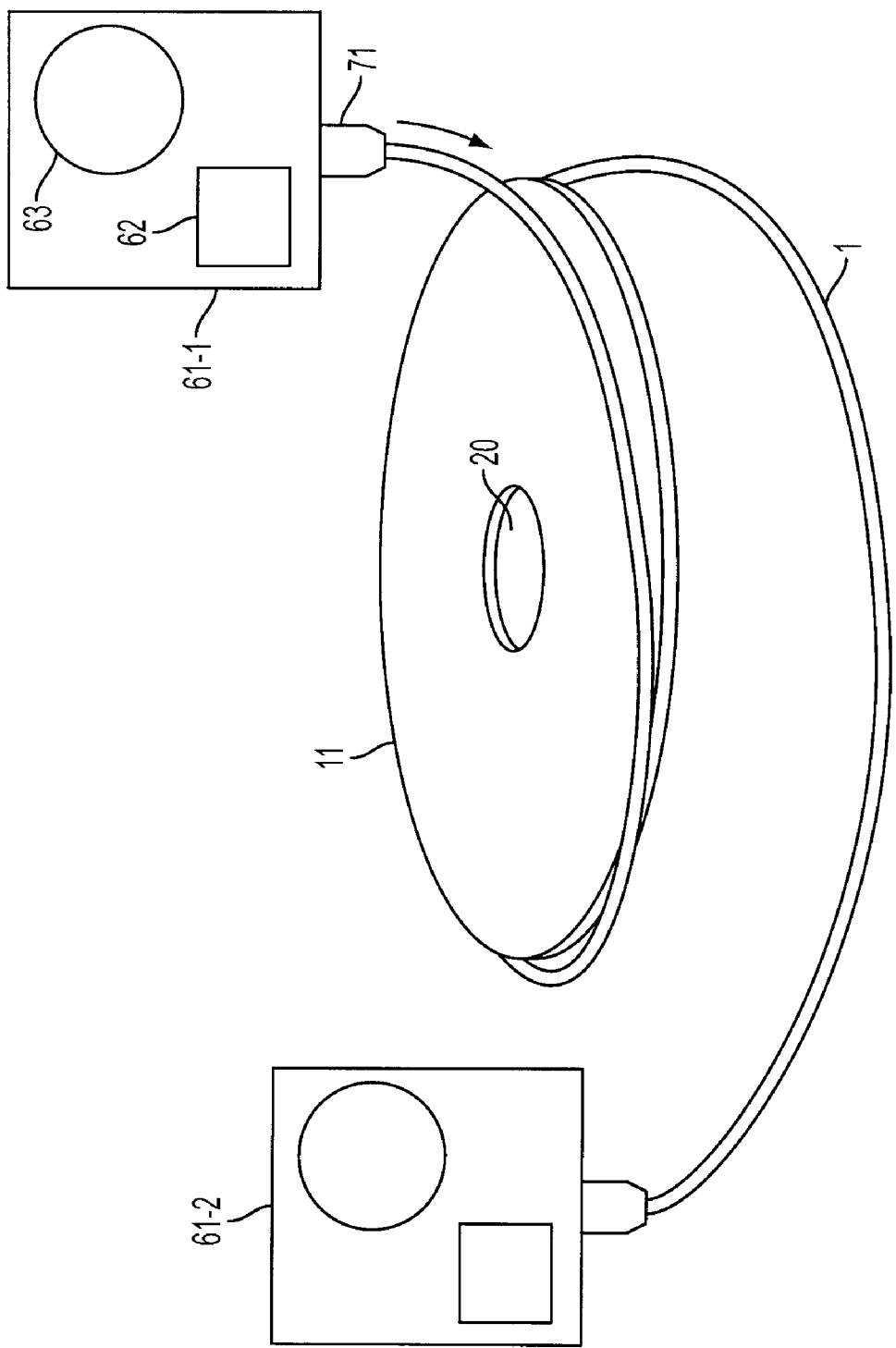
FIG. 6A is a schematic illustration of an apparatus for fabricating a fiber optic sensor, in accordance with an embodiment of the invention.

FIG. 6A schematically illustrates an apparatus for forming a fiber optic coil sensor, in accordance with an embodiment of the invention. A continuous fiber optic cable 1 may be fed from either of two winding heads 61-1, 61-2. Each winding head includes a fiber spool 63 and a feed motor 62 for feeding the fiber optic cable from the spool through a fiber applicator portion 71. Coil form 11 rests upon a support surface (not shown) and the winding heads are moved relative to the coil form using mechanical stages (not shown). FIG. 6A illustrates winding head 61-1 as it begins to feed cable 1, in the direction shown by the arrow, onto coil form 11 (preferably with an adhesive layer 22 already on the surface thereof) in a substantially planar spiral to make the first outside-in coil layer 12a. After the coil form is flipped over, winding head 61-2 is used to make coil layers on the other side of the coil form 11. It will be appreciated that the use of two winding heads, feeding a continuous fiber optic cable, permits formation of a stable, thermally symmetric coil sensor without crossovers or cable breaks.

Alternatively, the coil form may be supported in such a way that both planar surfaces thereof are accessible at the same time. In an embodiment, winding head 61-1 forms a coil layer on one surface while winding head 61-2 forms another coil layer on the opposite surface. As understood by those skilled in the art, the mechanical stages may be configured so that each winding head may move from one side of the coil form to the other without the need for flipping the coil form.

Figure 6B:
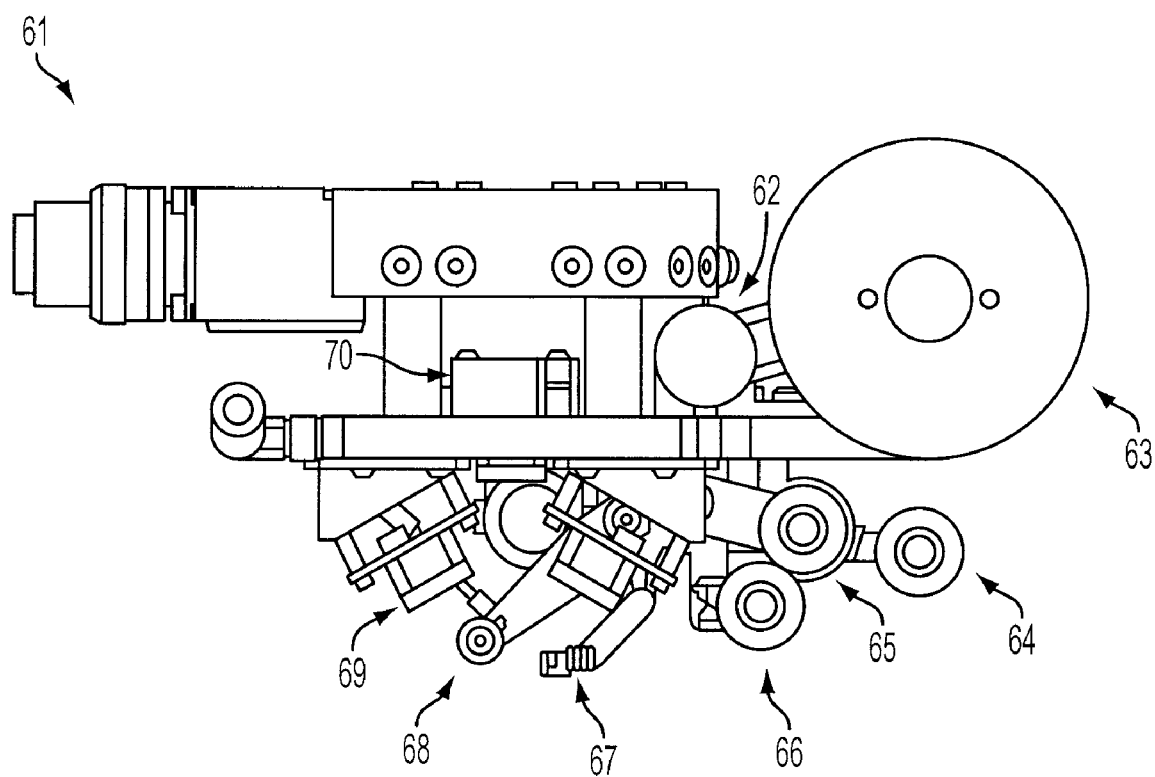
FIG. 6B is a diagram illustrating a schematic of a winding head according to an embodiment of the invention.

Some details of winding head 61 are schematically illustrated in FIG. 6B; winding head 61 may be used as the first winding head and the second winding head according to various embodiments of the invention. The winding head 61 comprises a feed motor 62, a fiber spool 63, a fiber tensioner 64, a fiber length encoder 65, an idler pulley 66, a fiber guide 67, a fiber applicator 68, a camera 69, and a height sensor 70. The fiber spool 63 is driven by the feed motor 62. Fiber optic cable is fed from the fiber spool 63 over the fiber tensioner 64, then between the fiber length encoder and the idler pulley 66. The fiber tensioner 64 provides a nominal tension, e.g., less than 35 gms, to the fiber optic cable as it is fed from the fiber spool 63 to control unwanted spool "unwinding" that could cause feed problems or fiber breakage. The fiber tensioner 64 acts in a closed loop with feed motor 62. As the tension on fiber tensioner 64 increases, the rotational speed of the feed motor 62 increases. Conversely, when the tension on fiber tensioner 64 decreases, the rotational speed of the feed motor 62 decreases. The fiber length encoder 65 provides a measurement of the length of fiber that has been fed from the fiber spool 63. The fiber length encoder 65 is spring loaded against the idler pulley 66 such that the idler pulley 66 guides the fiber optic cable to the fiber guide 67. The fiber guide 67 orients the fiber optic cable such that it may be applied to a substrate. The fiber guide 67 may comprise a first half and a second half such that the fiber optic cable may be threaded through the fiber guide 67 without requiring that the fiber optic cable have a cut end. The fiber applicator 68 is a solenoid or pneumatic cylinder operated arm with a ball bearing mounted wheel used to apply pressure to the fiber as it comes into contact with the substrate. Camera 69 comprises at least one camera to observe the fiber as it is applied. The camera 69 may be used by a human operator or by vision hardware/software to automate production. The height sensor 70 provides a winding head height taken relative to the substrate. This height can be used to ensure that the fiber guide 67 is at the right height or to apply the fiber optic cable to a substrate with varying heights.

Figure 7:
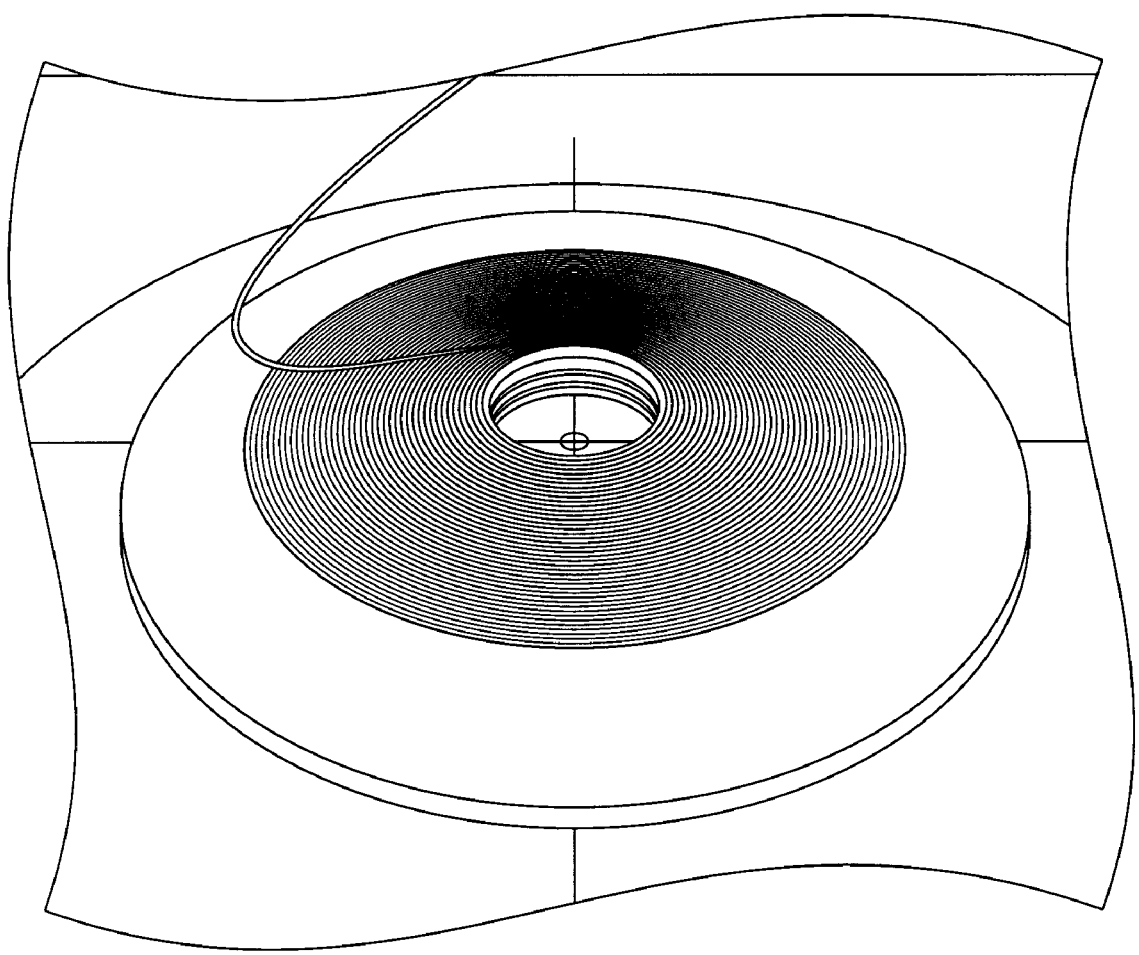
FIG. 7 is a photograph of a fiber optic coil layer fabricated according to a method embodying the invention.
Figure 8:
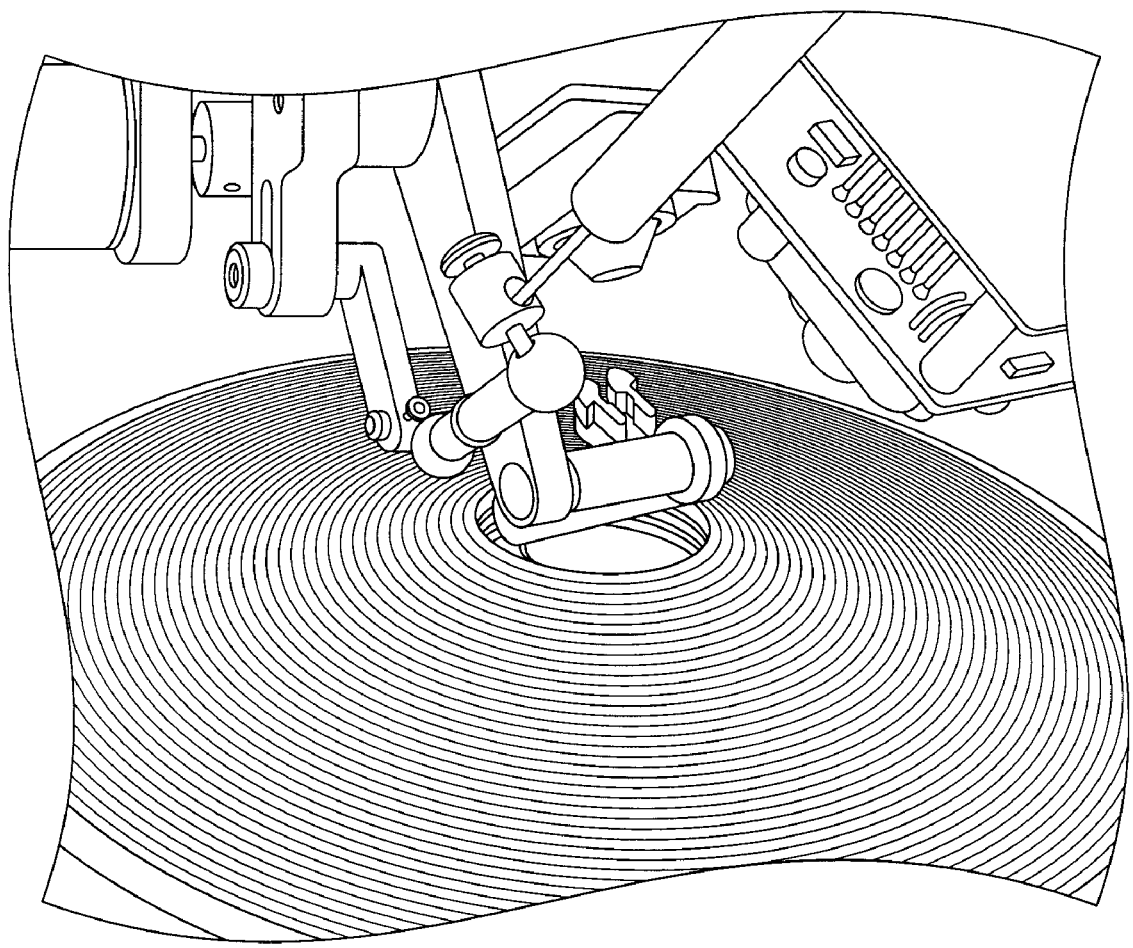
FIGS. 8 and 9 are photographs of a winding head dispensing a fiber optic cable to form a fiber optic coil layer in accordance with the invention.
Figure 9:
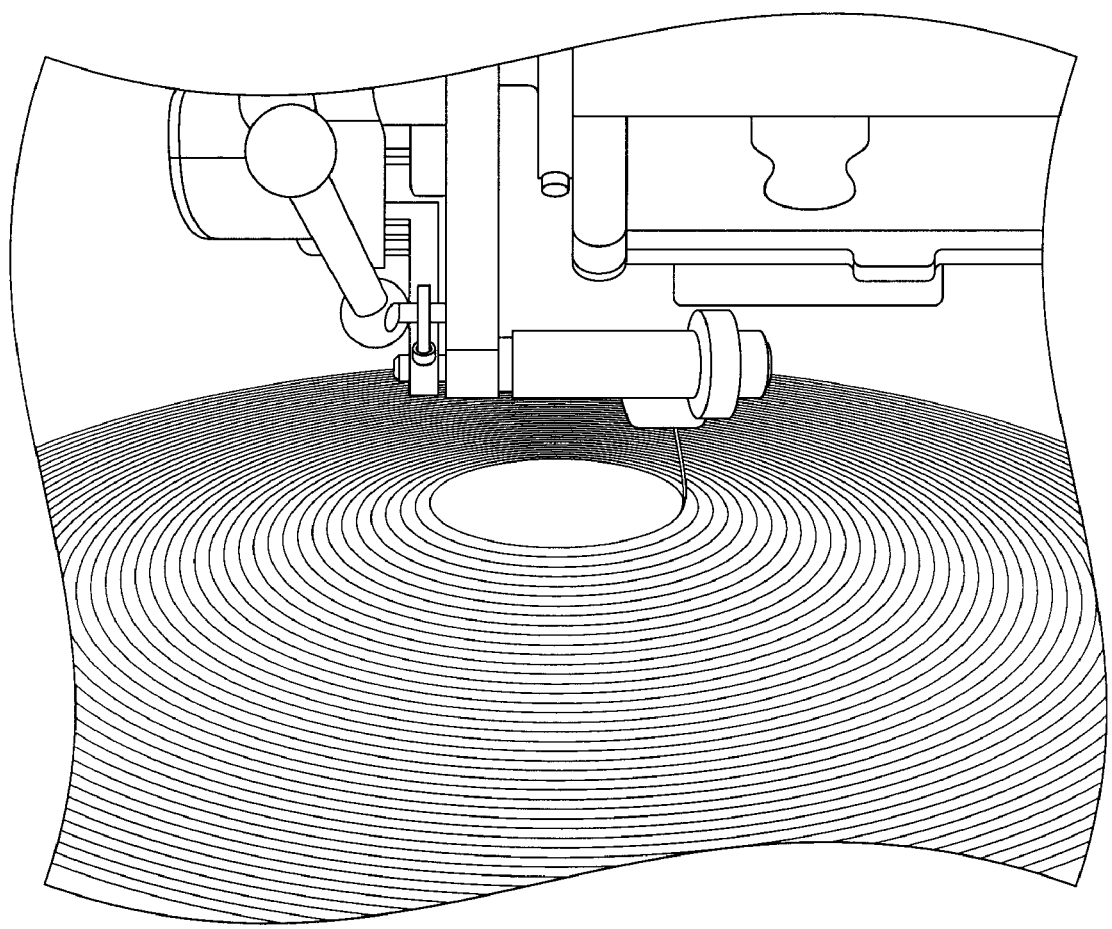
Figure 10:
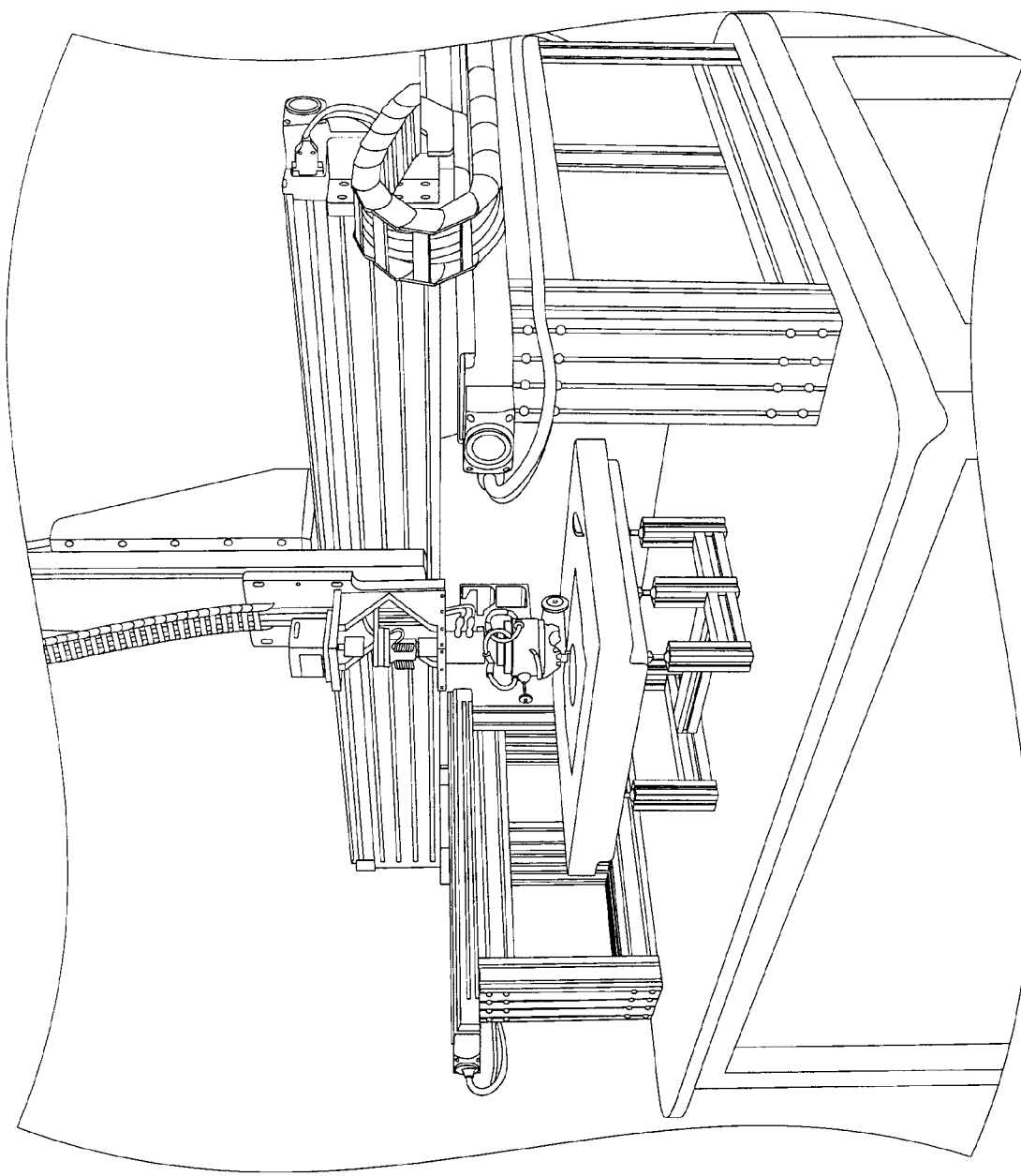
FIGS. 10 and 11 are photographs showing general views of an apparatus for fabricating a fiber optic sensor, in accordance with an embodiment of the invention.
Figure 11:
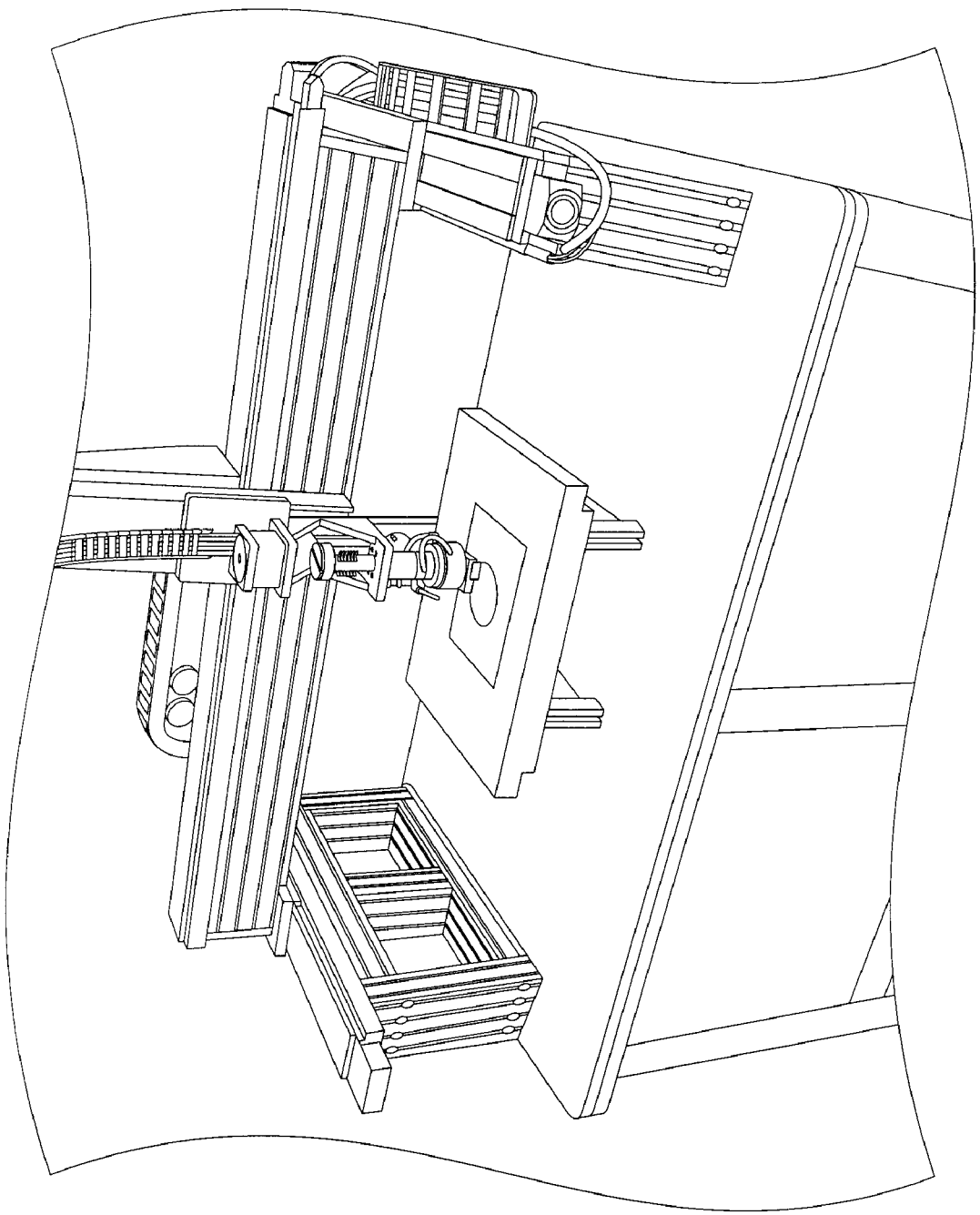
Figure 12:
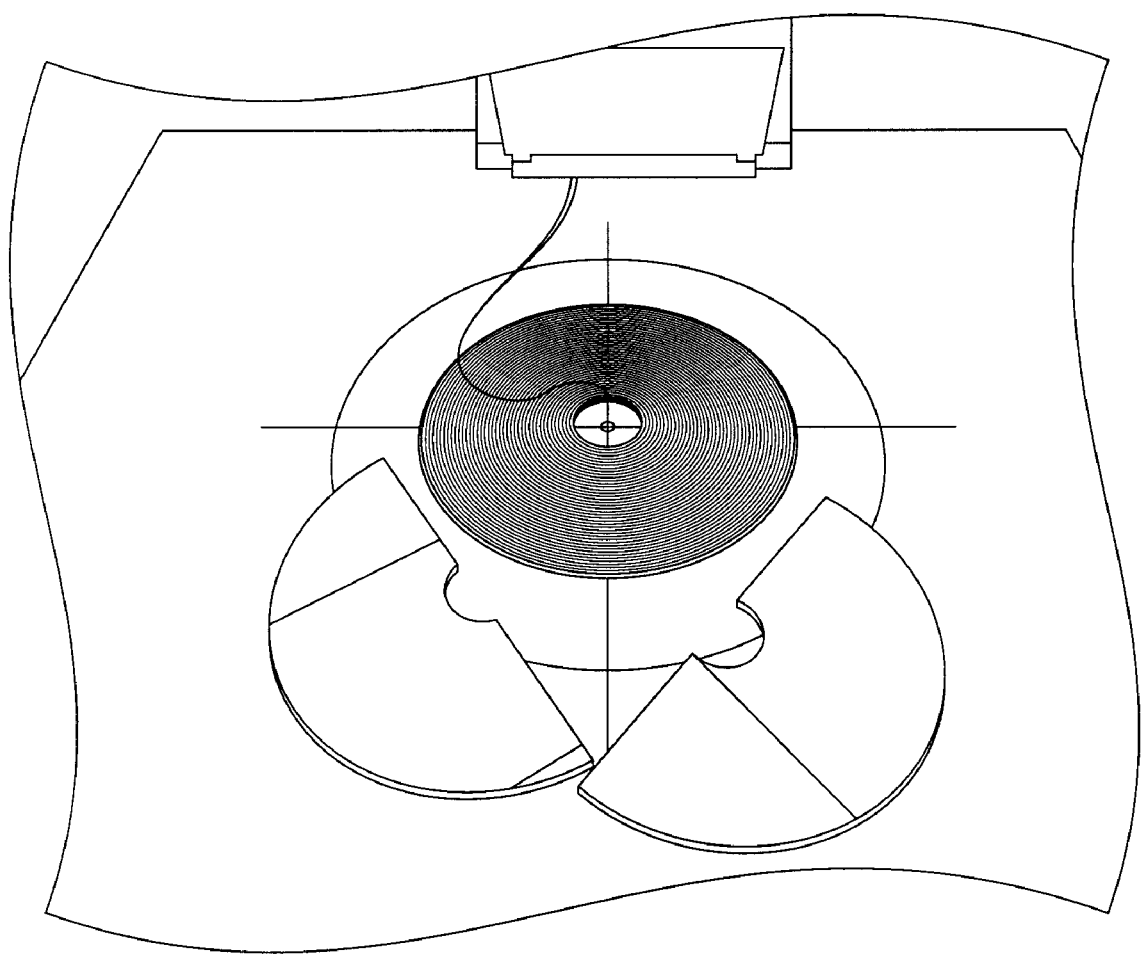
FIG. 12 is a photograph of a fiber optic coil layer and split separator sheets used therewith, in accordance with an embodiment of the invention.

FIG. 7 shows a fiber optic coil layer on a substrate, fabricated according to the method described above. FIGS. 8 and 9 illustrate a fiber optic coil layer being wound on a substrate using a winding head. FIGS. 10 and 11 show an automatic winding machine used to wind the fiber optic coil layers, including the mechanical stage for moving the winding head relative to the substrate. FIG. 12 shows a pair of split separator sheets used with the coil layer to form a fiber optic coil sensor according to an embodiment of the invention. As shown in the dimensioned drawing of FIG. 13, a typical sensor embodying the invention has a coil form with an outside diameter of 80 mm, a central aperture 15 mm in diameter, and a thickness of 1.2 mm. A typical diameter for the fiber optic cable 1 is 150 μ.

Applications for a fiber optic coil sensor according to the present invention include, but are not limited to, FOGs and inertial measurement units (IMUs).

While detailed and specific embodiments of the crossover-free fiber optical coil sensor and winding method have been described herein, it will be apparent to those skilled in the art that various changes and modifications can be made therein without departing from the spirit and scope of the disclosed crossover-free fiber optical coil sensor and winding method. Thus, it is intended that the present disclosure cover these modifications and variations provided they come within the scope of any appended claims and/or their equivalents.

What is claimed is:

1. A method for winding a crossover-free fiber optic coil sensor comprising:
   a) winding fiber optic cable onto a first supply spool and a second supply spool;
   b) attaching the fiber optic cable to an outer edge of a coil form, wherein the coil form comprises a first side and a second side;
   c) forming a first outside-in coil layer on the first side of the coil form using a first winding head, wherein the first supply spool supplies fiber optic cable to the first winding head;
   d) attaching a first inside-out separator to the first outside-in coil layer;
   e) forming a first inside-out coil layer on the first inside-out separator using the first winding head;
   f) forming a second outside-in coil layer on the second side of the coil form using a second winding head, wherein the second supply spool supplies fiber optic cable to the second winding head;
   g) attaching a second inside-out separator to the second outside-in coil layer; and
   h) forming a second inside-out coil layer on the second inside-out separator using the second winding head.

2. The method of claim 1, wherein the structure of the first winding head and the structure of the second winding head are substantially the same.

3. The method of claim 1, wherein the fiber optic cable comprises a single continuous fiber optic cable.

4. The method of claim 3, wherein the center of the fiber optic cable is attached to the outer edge of the coil form.

5. The method of claim 1, wherein the amount of fiber optic cable on the first supply spool and the amount of fiber optic cable on the second supply spool are substantially equal in length.

6. The method of claim 1, wherein the fiber optic cable comprises single mode fiber optic cable.

7. The method of claim 1, wherein the inside-out separators each comprise a first half and a second half.

8. The method of claim 1, wherein the inside-out separators each comprise a heat conductive material.

9. The method of claim 1, wherein at least one of the inside-out separators further comprises perforations.

10. The method of claim 1 further comprising:
    placing the coil form in a housing; and
    encapsulating the coil form in a potting material.

11. The method of claim 1, further comprising:
    i) attaching a first outside-in separator to the second inside-out coil layer;
    j) forming a third outside-in coil layer on the first outside-in separator with the first winding head;
    k) attaching a third inside-out separator to the third outside-in coil layer; and
    l) forming a third inside-out coil layer on the third inside-out separator with the first winding head.

12. The method of claim 11, further comprising:
    m) flipping the coil form;
    n) attaching a second outside-in separator to the first inside-out coil layer;
    o) forming a fourth outside-in coil layer on second outside-in separator with the second winding head;
    p) attaching a fourth inside-out separator to the fourth outside-in coil layer; and, q) forming a fourth inside-out coil layer on the fourth inside-out separator with the second winding head.

13. The method of claim 12, wherein the outside-in separators comprise a heat conductive material.

14. The method of claim 13, wherein the outside-in separators further comprise perforations.

15. The method of claim 12 further comprising iteratively repeating steps i) through q).

16. A crossover-free fiber optic coil sensor comprising:
    a coil form, wherein the coil form comprises a first side, a second side, and an outer edge;
    a fiber optic cable comprising a first fiber section and a second fiber section, wherein at least a portion of the fiber optic cable is attached to the outer edge of the coil form;
    a first outside-in coil layer, formed on the first side of the coil form, wherein the first outside-in coil layer is formed from the first fiber section;
    a first inside-out separator attached to the first outside-in coil layer;
    a first inside-out coil layer, formed on the first inside-out separator, wherein the first inside-out coil layer is formed from the first fiber section;
    a second outside-in coil layer, formed on the second side of the coil form, wherein the second outside-in coil layer is formed from the second fiber section;
    a second inside-out separator attached to the second outside-in coil layer; and,
    a second inside-out coil layer, formed on the second inside-out separator, wherein the second inside-out coil layer is formed from the second fiber section.

17. The sensor of claim 16, wherein the fiber optic cable is a single continuous fiber optic cable.

18. The sensor of claim 16, wherein the first fiber section and the second fiber section are of substantially equal length.

19. The sensor of claim 16, wherein the fiber optic cable comprises single mode fiber optic cable.

20. The sensor of claim 16, wherein the inside-out separators each comprise a first half and a second half.

21. The sensor of claim 16, wherein the inside-out separators each comprise a double-sided adhesive sheet.

22. The sensor of claim 16, wherein the inside-out separators each comprise a heat conductive material.

23. The sensor of claim 16, wherein at least one of the inside-out separators further comprises perforations.

24. The sensor of claim 16, further comprising:
    a housing, wherein the coil form is situated within the housing; and,
    potting material, wherein the potting material encapsulates the coil form.

25. The sensor of claim 16, further comprising:
    a first outside-in separator attached to the second inside-out coil layer;
    a third outside-in coil layer, formed on the first outside-in separator, wherein the third outside-in coil layer is formed from the first fiber section;
    a third inside-out separator attached to the third outside-in coil layer;
    a third inside-out coil layer, formed on the third inside-out separator, wherein the third inside-out coil layer is formed from the first fiber section;
    a second outside-in separator attached to the first inside-out coil layer;
    a fourth outside-in coil layer, formed on the second outside-in separator, wherein the fourth outside-in coil layer is formed from the second fiber section;
    a fourth inside-out separator attached to the fourth outside-in coil layer; and, a fourth inside-out coil layer, formed on the fourth inside-out separator, wherein the fourth inside-out coil layer is formed from the second fiber section.

26. The sensor of claim 25, wherein the outside-in separators comprise a heat conductive material.

27. The sensor of claim 26, wherein the outside-in separators further comprise perforations.

28. An apparatus for fabricating a fiber optic coil sensor, comprising:
a first winding head for applying a fiber optic cable in a substantially planar spiral to a first surface of a substrate, the first winding head including a first fiber spool, a first feed motor, a first applicator portion, and a first pressure wheel for applying pressure to the fiber optic cable as said cable is applied to the first surface; and
a second winding head for applying the fiber optic cable in a substantially planar spiral to a second surface of the substrate, the second winding head including a second fiber spool, a second feed motor, a second applicator portion, and a second pressure wheel for applying pressure to the fiber optic cable is applied to the second surface,
wherein the fiber optic cable is a continuous cable extending from the first spool to the second spool.

29. An apparatus according to claim 28, wherein
the first winding head is connected to a first stage for moving the first winding head relative to the substrate, and
the second winding head is connected to a second stage for moving the second winding head relative to the substrate.

30. The sensor of claim 16, wherein at least one of the inside-out separators has an aperture at an interior thereof and a flange at the edge of the aperture.

31. The sensor of claim 25, wherein at least one of the outside-in separators has a flange at the outside edge thereof.

32. The sensor of claim 18, wherein
a first set of coil layers are disposed on the first side of the coil form,
a second set of coil layers are disposed on the second side of the coil form, and
the number of layers in the first set and in the second set are equal, so that the sensor is substantially thermally symmetric.

33. A method for fabricating a fiber optic coil sensor, comprising the steps of:
attaching a fiber optic cable to an outer edge of a coil form at an attachment point thereon, the coil form having a first side and a second side;
forming a first outside-in coil layer on the first side using a first winding head supplying fiber optic cable from a first supply spool;
subsequently forming a first inside-out coil layer on the first side using the first winding head;
forming a second outside-in coil layer on the second side using a second winding head supplying fiber optic cable from a second supply spool; and
subsequently forming a second inside-out coil layer on the second side using the second winding head,
thereby forming a first set of coil layers on the first side and a second set of coil layers on the second side, connected at the attachment point,
wherein fiber optic cable connections between the first set and the second set are located only outside the circumference of the coil form.

34. The method of claim 33, further comprising the steps of:
attaching a first separator to the first outside-in coil layer before forming the first inside-out coil layer; and
attaching a second separator to the second outside-in coil layer before forming the second inside-out coil layer,
so that two coil layers of each set have a separator disposed there between.

35. The method of claim 33, wherein the fiber optic cable comprises a single continuous fiber optic cable.

36. The method of claim 35, wherein the center of the fiber optic cable is attached to the outer edge of the coil form at the attachment point.

37. The method of claim 34, wherein the separators each comprise a first half and a second half.

38. The method of claim 34, further comprising providing each separator with an adhesive surface for adhering to a coil layer.

39. The method of claim 33, further comprising the steps of:
forming a first adhesive layer on the first side of the coil form, before forming the first outside-in coil layer; and
forming a second adhesive layer on the second side of the coil form, before forming the second outside-in coil layer.

40. The method of claim 34, wherein at least one separator comprises a heat conductive material.

41. The method of claim 34, wherein at least one separator further comprises perforations.

42. The method of claim 33, further comprising the steps of:
placing the coil form in a housing; and
encapsulating the coil form in a potting material.

43. A crossover-free fiber optic coil sensor comprising:
a coil form having a first side, a second side, and an outer edge;
a first set of coil layers and a second set of coil layers disposed on the first side and the second side respectively, each of said coil layers having fiber optic cable arranged in a substantially planar spiral;
a first set of separators and a second set of separators interspersed between adjacent coil layers on the first side and the second side respectively; and
a section of fiber optic cable connecting a coil layer in the first set with a coil layer in the second set, located at the outer edge,
wherein in each of the first set and second set, the coil layers comprise alternating outside-in and inside-out coil layers.

44. The sensor of claim 43, wherein said section of fiber optic cable is attached to the outer edge of the coil form.

45. The sensor of claim 43, wherein fiber optic cable connections between the first set and the second set are located only outside the circumference of the coil form.

46. The sensor of claim 43, wherein the fiber optic cable comprises a single continuous fiber optic cable.

47. The sensor of claim 43, wherein
the first set and the second set have substantially equal lengths of fiber optic cable, and
the number of coil layers in the first set and in the second set are equal, so that the sensor is substantially thermally symmetric.

48. The sensor of claim 43, wherein each of the separators has an adhesive layer for adhering to a coil layer.

49. The sensor of claim 43, wherein the separators each comprise a first half and a second half.

50. The sensor of claim 43, wherein a separator having an inside-out coil layer formed on a surface facing away from the coil form is characterized as an inside-out separator, and at least one inside-out separator has an aperture at an interior thereof and a flange at the edge of the aperture.

51. The sensor of claim 43, wherein a separator having an outside-in coil layer formed on a surface facing away from the coil form is characterized as an outside-in separator, and at least one outside-in separator has a flange at the outside edge thereof.

52. The method of claim 1, wherein the fiber optic cable comprises polarization-maintaining fiber optic cable.

53. The method of claim 1, wherein the inside-out separators each comprise a double-sided adhesive sheet.

54. The method of claim 8, wherein the heat conductive material comprises copper.

55. The method of claim 13, wherein the heat conductive material comprises copper.

56. The sensor of claim 16, wherein the fiber optic cable comprises polarization-maintaining fiber optic cable.

57. The sensor of claim 22, wherein the heat conductive material comprises copper.

58. The sensor of claim 26, wherein the heat conductive material comprises copper.

* * * * *